US008199026B2

(12) United States Patent
Lin et al.

(10) Patent No.: US 8,199,026 B2
(45) Date of Patent: Jun. 12, 2012

(54) QUANTIFICATION INDICATING CIRCUIT

(75) Inventors: Bing-Min Lin, Taipei (TW);
Chao-Chung Wu, Taipei (TW);
Chin-Fu Ho, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 893 days.

(21) Appl. No.: 12/190,598

(22) Filed: Aug. 13, 2008

(65) Prior Publication Data

US 2009/0066268 A1    Mar. 12, 2009

(30) Foreign Application Priority Data

Sep. 12, 2007   (TW) ................................ 96134024 A

(51) Int. Cl.
*G08B 5/00* (2006.01)
(52) U.S. Cl. ............. 340/815.4; 340/815.45; 340/815.46
(58) Field of Classification Search ............... 340/815.4, 340/468, 657, 815.45, 815.46, 815.47; 345/40, 345/46
See application file for complete search history.

(56) References Cited

U.S. PATENT DOCUMENTS

| | | | | |
|---|---|---|---|---|
| 4,262,255 A * | 4/1981 | Kokei et al. ................... | 345/40 |
| 4,440,059 A * | 4/1984 | Hunter ...................... | 340/815.46 |
| 4,679,042 A * | 7/1987 | Trethewey ................... | 345/40 |
| 5,194,854 A * | 3/1993 | Havel ........................ | 340/815.65 |
| 6,011,467 A * | 1/2000 | Kamei et al. ............. | 340/815.45 |
| 6,437,310 B2 * | 8/2002 | Hesketh ..................... | 250/214 C |
| 7,123,136 B2 * | 10/2006 | Sugimoto et al. ......... | 340/815.45 |
| 7,247,821 B2 * | 7/2007 | Wilsdorf ................... | 340/815.53 |
| 2005/0055474 A1 | 3/2005 | Yang | |

FOREIGN PATENT DOCUMENTS

| | | |
|---|---|---|
| CN | 1431593 | 7/2003 |
| TW | M313236 | 6/2007 |

OTHER PUBLICATIONS

"1st Office Action of China counterpart application", issued on Jan. 8, 2010, p. 1-p. 5.
"Office Action of Taiwan Counterpart Application", issued on Mar. 1, 2011, p. 1-p. 4, in which the listed reference was cited.

* cited by examiner

*Primary Examiner* — John A Tweel, Jr.
(74) *Attorney, Agent, or Firm* — Jianq Chyun IP Office

(57) ABSTRACT

A quantification indicating circuit includes an indicating lamp set, a converting circuit, and an indicating lamp control circuit. The indicating lamp set has a plurality of indicating lamps. The converting circuit has a plurality of predetermined threshold values which are compared with a numerical signal of a circuit board to generate a comparison result. The comparison result is converted to be outputs of a plurality of control bits. The indicating lamp control circuit is coupled between the indicating lamp set and the converting circuit and is used for controlling the number of the indicating lamps which are brightened according to the outputs of the control bits.

10 Claims, 4 Drawing Sheets

| C B A | L1 L2 L3 L4 L5 |
|---|---|
| 0 0 0 | X X X X X |
| 0 0 1 | 0 X X X X |
| 0 1 0 | 0 0 X X X |
| 0 1 1 | 0 0 X X X |
| 1 0 0 | 0 0 0 X X |
| 1 0 1 | 0 0 0 X X |
| 1 1 0 | 0 0 0 0 X |
| 1 1 1 | 0 0 0 0 0 |

QUANTIFICATION INDICATING CIRCUIT

CROSS-REFERENCE TO RELATED APPLICATION

This application claims the priority benefit of Taiwan application serial no. 96134024, filed on Sep. 12, 2007. The entirety of the above-mentioned patent application is hereby incorporated by reference herein and made a part of this specification.

BACKGROUND OF THE INVENTION

1. Field of the Invention

The invention relates to a quantification indicating circuit and, more particularly, to a quantification indicating circuit applied to a motherboard.

2. Description of the Related Art

For a user using a computer, if he wants to adjust the operation frequency and the voltage of a motherboard, he has to set via a basic input output system (BIOS) or control software applied to a windows interface. Setting values are displayed on a screen during a setting process to allow the user to know the present setting state of the motherboard.

FIG. 1 is a schematic diagram showing the coupling relationship of a motherboard monitoring circuit in a conventional motherboard. As shown in FIG. 1, a reference number 100 denotes a motherboard, a reference number 102 denotes a motherboard monitoring circuit, and a reference number 110 denotes a screen. Taking the adjustment of the frequency as an example, when the user sets the operation frequency of the motherboard 100 via the BIOS or the control software, the motherboard monitoring circuit 102 can receive a numerical signal IN generated by the motherboard 100, and the numerical signal IN denotes the value of the present operation frequency of the motherboard 100. Afterward, the motherboard monitoring circuit 102 allows the value denoted by the numerical signal IN to be displayed on the screen 110. In this way, the user can know the present operation frequency of the motherboard 100 via the value displayed by the screen 110.

The value is only displayed by the screen in the conventional method. A computer game player often works in an over-frequency state, and every player does not remember to adjust the operation frequency back to a normal value after he finishes playing a game, and every player does not remember to check whether an over-frequency setting exists via the BIOS or the control software after he boots a computer up. Then, the motherboard is often operated in the over-frequency state, and then it is easy to be overheated, which may affect its performance and even damage the motherboard. In the mode of displaying the value via the screen, the user needs to switch images to obtain data. For a user handling other work, he cannot know states of the frequency, the temperature and the voltage of the motherboard in real time, which is inconvenient.

BRIEF SUMMARY OF THE INVENTION

The objective of the invention is to provide a quantification indicating circuit, and the invention provides a further humanization quantification indicating design to allow a user to conveniently inspect the usage state of a motherboard.

Based on the above and other objectives, the invention provides a quantification indicating circuit which is suitable to be disposed on a circuit board. The quantification indicating circuit includes an indicating lighten element set, a converting circuit and an indicating lighten element control circuit, and the indicating lighten element set has a plurality of indicating lighten elements. The converting circuit receives a numerical signal of the circuit board. After the numerical signal is compared with a plurality of threshold values in the converting circuit, a combination bit signal is generated by a plurality of control bits and is outputted. The indicating lighten element control circuit determines and controls the number of the brightened indicating lighten elements of the indicating lighten element set according to the combination bit signal.

In the invention, the converting circuit compares the numerical signal with a plurality of predetermined threshold values, and then, a comparison result is converted to outputs of a plurality of control bits, and finally, the indicating lighten element control circuit brightens the indicating lighten elements in the indicating lighten element set according to the outputs of the control bits. The number of the brightened indicating lighten elements is used as a response to the value denoted by the numerical signal. In this way, a user can know the present usage state of a circuit board or a motherboard when he knows the number of the brightened indicating lighten elements, which achieves a further humanization quantification indication.

These and other features, aspects, and advantages of the present invention will become better understood with regard to the following description, appended claims, and accompanying drawings.

DETAILED DESCRIPTION OF THE EMBODIMENTS

Figure 1:
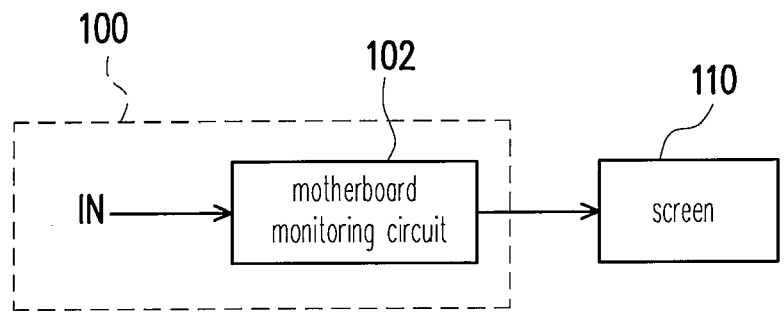
FIG. 1 is a schematic diagram showing the coupling relationship of a motherboard monitoring circuit in a conventional motherboard.
Figure 2:
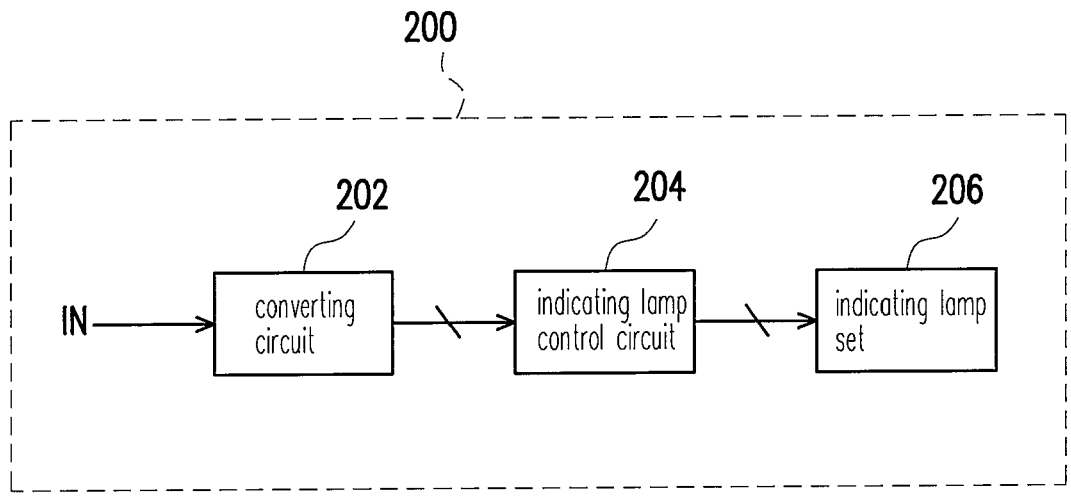
FIG. 2 is a block diagram showing a quantification indicating circuit according to one embodiment of the invention.

FIG. 2 is a block diagram showing a quantification indicating circuit according to one embodiment of the invention. The quantification indicating circuit is suitable to be disposed on a circuit board, and the circuit board is, for example, a motherboard or an element support plate for any electronic products. As shown in FIG. 2, a reference number 200 denotes a circuit board. The quantification indicating circuit includes a converting circuit 202, an indicating lamp control circuit 204 and an indicating lamp set 206, and the indicating lamp set 206 has a plurality of indicating lamps (such as 361 to 365 shown in FIG. 3). The converting circuit 202 is used to receive a numerical signal IN from the circuit board 200, and the numerical signal IN may be a frequency value, a voltage value or a temperature value. The converting circuit 202 may be designed as, for example, a plurality of comparators which cooperate with a plurality of threshold values of the converting circuit 202 to compare or determine whether the numerical signal IN is greater or less than the threshold values. Then, according to all comparison results, the converting circuit 202 output the control bits to the indicating lamp control circuit 204. However, the method of obtaining the comparison result is not limited by the above method. For example, when the numerical signal IN is between two closest threshold values, a corresponding comparison result may be generated by the two closest threshold values. Then, the two closest threshold values are converted to the control bits. The indicating lamp control circuit 204 is coupled between the indicating lamp set 206 and the converting circuit 202. The indicating lamp control circuit 204 brighten the indicating lamps according to the control bits, and the number of the brightened indicating lamps is used as a response to the value denoted by the numerical signal IN.

Figure 3:
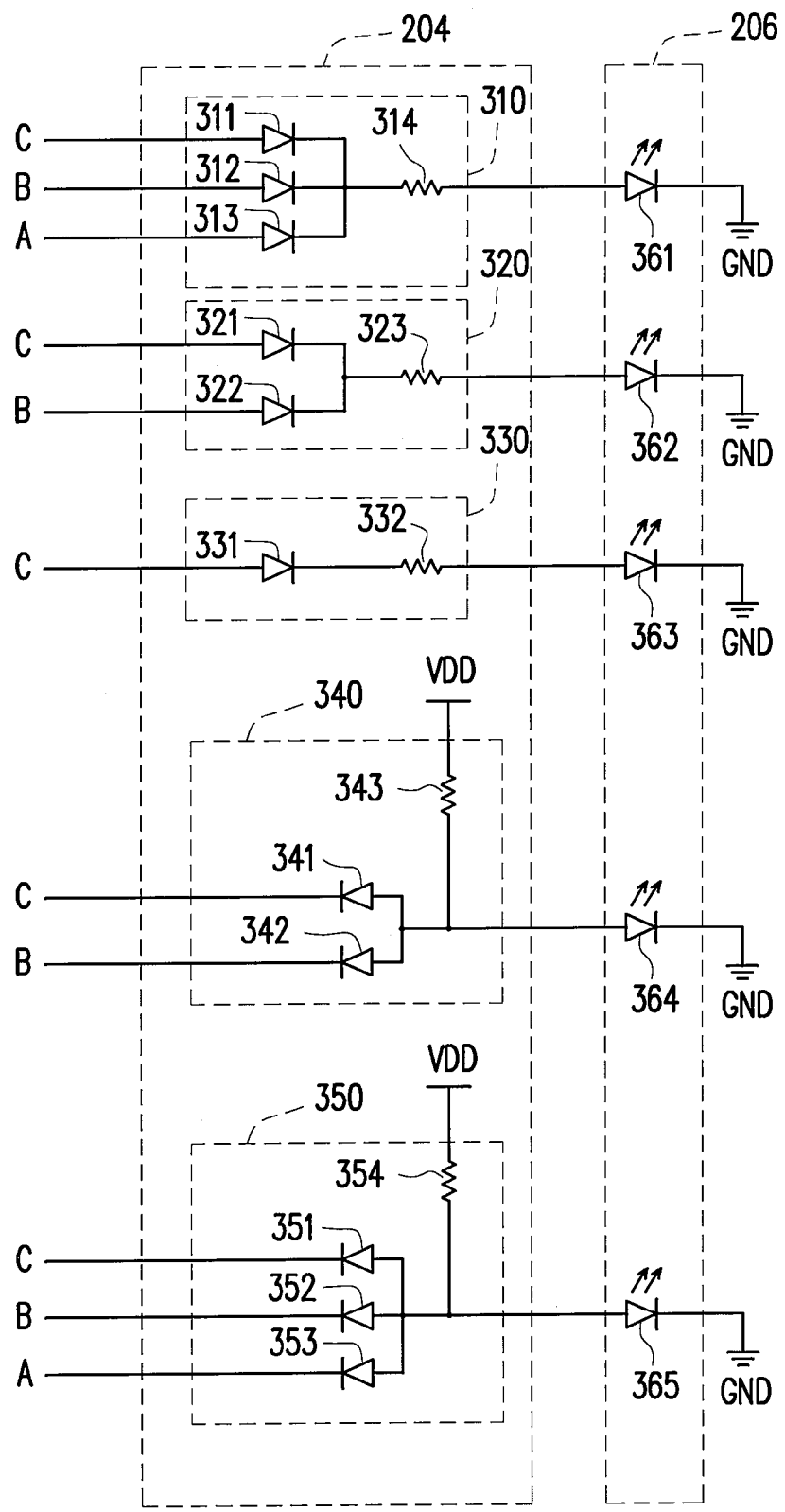
FIG. 3 is a schematic diagram showing an indicating lamp control circuit and an indicating lamp set in one embodiment of the invention.

To further illustrate the indicating lamp control circuit 204 and the indicating lamp set 206, FIG. 3 shows implementing methods of the indicating lamp control circuit and the indicating lamp set. Assume that the number of the control bits is three, and the control bits are a first control bit C, a second control bit B and a third control bit A, respectively. Assume that the number of the indicating lamps is five. The above numbers can be adjusted according to a practical situation. As shown in FIG. 3, VDD and GND denote a high voltage and a ground potential, respectively. The indicating lamp control circuit 204 includes five logic circuits 310 to 350. The first logic circuit 310 includes three diodes 311 to 313 and a resistance 314, and input terminals (namely, P terminals of the diodes) of the three diodes 311 to 313 are connected to the first control bit C, the second control bit B and the third control bit A, respectively. The second logic circuit 320 includes two diodes 321 and 322 and a resistance 323, and input terminals (P terminals) of the two diodes 321 and 322 are connected to the first control bit C and the second control bit B, respectively. The third logic circuit 330 includes a diode 331 and a resistance 332, and the input terminal (the P terminal) of the diode 331 is connected to the first control bit signal C. The fourth logic circuit 340 includes diodes 341 and 342 and a resistance 343, and output terminals (namely, N terminals of the diodes) of the two diodes 341 and 342 are connected to the first control bit C and the second control bit B, respectively. A high voltage VDD is provided for the input terminals of the two diodes 341 and 342. The fifth logic circuit 350 includes diodes 351 to 353 and a resistance 354, and output terminals (N terminals) of the three diodes 351 to 353 are connected to the first control bit C, the second control bit B and the third control bit A, respectively. The high voltage VDD is provided for the input terminals of the three diodes 351 to 353.

Certainly, a user can determine whether to utilize the above resistances according to a practical requirement. In the embodiment, the indicating lamps in the indicating lamp set 206 may be, for example, light emitting diodes. The first indicating lamp 361 is connected to a first common output terminal (N terminal) of the three diodes 311 to 313 of the first logic circuit 310 via the resistance 314. The second indicating lamp 362 is connected to a second common output terminal (N terminal) of the two diodes 321 and 322 of the second logic circuit 320 via the resistance 323. The third indicating lamp 363 is connected to the output terminal (N terminal) of the diode 331 of the third logic circuit 330 via the resistance 332. The fourth indicating lamp 364 is connected to a first common input terminal (P terminal) of the two diodes 341 and 342 of the fourth logic circuit 340. The fifth indicating lamp 365 is connected to a second input terminal (P terminal) of the three diodes 351 to 353 of the fifth logic circuit 350.

Figures 4, 5:
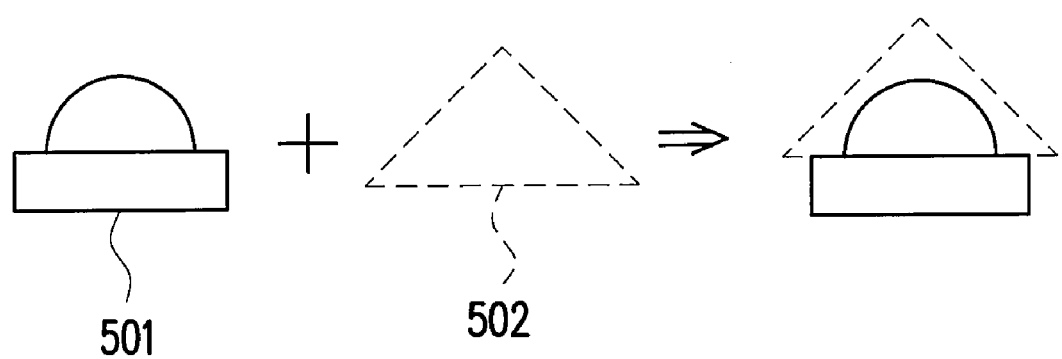
FIG. 4 shows a truth table of the circuit shown in FIG. 3.
FIG. 5 is a schematic diagram showing a mode of disposing indicating patterns.

A truth table is shown in FIG. 4 to illustrate the operation mode of the circuit shown in FIG. 3. C, B and A denote the control bits, and L1 to L5 denote the indicating lamps 361 to 365, respectively. In the truth table, x denotes that the light emitting diode does not conduct and is in an off state; o denotes that the light emitting diode conducts and is in an on state. The operation mode of the logic circuit 310 is performing an OR logic operation on the control bits A, B and C. So long as the value of one of the control bits A, B and C is one, the light emitting diode 361 is brightened. That is, the output formula Y(L1)=A+B+C is obtained according to the logic operation. Similarly, a output formula Y(L2)=B+C is obtained according to the operation mode of the second logic circuit 320, a output formula Y(L3)=C is obtained according to the operation mode of the third logic circuit 330, a output formula Y(L4)=B*C is obtained according to the operation mode of the fourth logic circuit 340, and a output formula Y(L5)=A*B*C is obtained according to the operation mode of the fifth logic circuit 350, wherein * denotes an AND logic operation.

Assume that the converting circuit 202 in FIG. 2 has five predetermined values, namely, 100 MHz, 120 MHz, 140 MHz, 160 MHz and 180 MHz. When the numerical signal IN is 95 MHz, the converting circuit 202 compares the numerical signal IN with the five predetermined values and determines their magnitude relationship. Since the numerical signal (95 MHz) is smaller than the five predetermined values, the corresponding control bits C, B, A which are (0, 0, 0) are obtained by conversion. Thus, the logic outputs Y(L1~L5) in FIG. 4 are all zero (x in FIG. 4 denotes that a light emitting diode does not conduct). Then, the output result of the circuit in FIG. 3 is obtained. The light emitting diodes 361 to 365 do not conduct, that is, the light emitting diodes 361 to 365 are in the off states.

In FIG. 2, when the numerical signal IN shown is 145 MHz, the converting circuit 202 compares the numerical signal IN with the five predetermined values and determines their magnitude relationship. Since the numerical signal IN (145 MHz) is greater than three predetermined values and is smaller than the other two predetermined values, the converting circuit 202 outputs the corresponding control bits C, B, A which are (1, 0, 0) or (1, 0, 1). Since each of the first logic circuit 310, the second logic circuit 320 and the third logic circuit 330 in FIG. 3 has one input terminal connected to the first control bit signal C, the control bits C, B, A which are (1, 0, 0) or (1, 0, 1) allows the three light emitting diodes 361 to 363 in FIG. 3 to be brightened. That is, as shown in FIG. 4, the logic outputs Y(L1~L3) are one (in FIG. 4, o denotes that a light emitting diode conducts). The output terminals of the two diodes 341 and 342 of the fourth logic circuit 340 are connected to the first control bit C and the second control bit B, respectively. So long as one of the control bit B or C is zero, the output of the fourth logic circuit is zero, and then the indicating lamp 364 is off. The N terminals of the three diodes 351 to 353 of the fifth logic circuit 350 are connected to the first control bit C, the second control bit B and the third control bit A, respectively. So long as one of the control bit A, B or C is zero, the output of the fifth logic circuit is zero, and the indicating lamp 365 is off. Therefore, the control bits C, B, A which are (1, 0, 0) or (1, 0, 1) may be selected to allow the three light emitting diodes 361 to 363 to be brightened.

In FIG. 2, when the numerical signal IN is 185 MHz, since the value of the numerical signal IN (185 MHz) is greater than the five predetermined values, the converting circuit 202 outputs the corresponding control bits C, B, A which are (1, 1, 1). The corresponding logic outputs Y(L1~L5) are all one, and they allow all the light emitting diodes 361 to 365 to be brightened.

Along with the adjustment of the operation frequency, the number of the light emitting diodes which are brightened is changed. A user can make the number of the light emitting diodes which are brightened increase along with the increase of the frequency, and then, the user can directly know the magnitude of the practical operation frequency. The number of the predetermined values can be adjusted according to the practical number of the indicating lamps or a practical operation situation. The user can increase or decrease the number of the light emitting diodes and change the number of the light emitting diodes which are brightened according to a practical requirement, and then he can correspondingly design the logic circuits in the indicating lamp control circuit according to the truth table. In this way, the indicating lamps can realize an indicating function according to the design of the user. The implementing method of the logic circuits 310 to 350 are correspondingly designed according to the truth table in FIG. 4, and it does not limit the invention.

Figure 6:
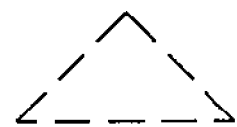
FIG. 6 is a schematic diagram showing the arrangement of the indicating patterns.
Figure 6:
Figure 6:
Figure 6:
Figure 6:

If a user wants to make a quantification indicating effect further intuitive, he can dispose a plurality of indicating patterns on the circuit board. Each indicating pattern is corresponding to one of the light emitting diode and is lightened by the corresponding light emitting diode. The above light emitting diodes may be a side emitting type light emitting diodes to ensure that light sent out really lightens the corresponding indicating patterns. FIG. 5 is a schematic diagram showing the mode of disposing the indicating patterns. As shown in FIG. 5, a reference number 501 denotes a top view diagram of the side emitting type light emitting diode, and a reference number 502 denotes one example of the indicating patterns such as a triangle. For example, the indicating patterns may be provided under the indicating lamps and be arranged in a row to generate a further intuitive quantification indicating effect and show an effect of increasing a speed. FIG. 6 is a schematic diagram showing the arrangement of the indicating patterns. Along with the increase of the number of the light emitting diodes which are brightened, the number of the indicating patterns which are lightened increases, so that the user can directly know the scope within which the present operation frequency of the circuit board is. Certainly, the style of the indicating patterns and the mode of arranging the indicating patterns can be changed according to a practical requirement, and they are not limited by the content shown in FIG. 5 and FIG. 6.

In the above embodiments, the value denoted by the numerical signal IN may be a voltage value, a temperature value or other setting values. A user can dispose a plurality of quantification indicating circuits on a circuit board or a motherboard at the same time to show states of the operation frequency, the voltage and the temperature of the circuit board or the motherboard, respectively. Certainly, the indicating lamps can be exposed outside the host of a computer or any electronic products according to a practical situation. The user can know the present usage state of the circuit board or the motherboard when he knows the number of the indicating lamps which are brightened. Thus, a further humanization quantification indicating effect is achieved. The indicating lamp is one embodiment of indicating lighten element, and indicating lamp is not for limiting the scope of the invention.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A quantification indicating circuit which is suitable to be disposed on a circuit board, the quantification indicating circuit comprising:
   an indicating lighten element set having a plurality of indicating lighten elements;
   a converting circuit which receives a numerical signal of the circuit board and compares the numerical signal with a plurality of threshold values in the converting circuit to output a plurality of control bits; and
   an indicating lighten element control circuit controlling the number of the indicating lighten elements which are brightened according to a first control bit, a second control bit, and a third control bit, the indicating lighten element control circuit comprises:
      a first logic circuit comprising three diodes whose input terminals are connected to the first control bit, the second control bit and the third control bit, respectively;
      a second logic circuit comprising two diodes whose input terminals are connected to the first control bit and the second control bit, respectively;
      a third logic circuit comprising a diode whose input terminal is connected to the first control bit;
      a fourth logic circuit comprising two diodes whose output terminals are connected to the first control bit and the second control bit, respectively, wherein a high voltage is provided for a first common input terminal of the two diodes; and
      a fifth logic circuit comprising three diodes whose output terminals are connected to the first control bit, the second control bit and the third control bit, respectively, wherein the high voltage is provided for a second common input terminal of the three diodes.

2. The quantification indicating circuit according to claim 1, wherein the numerical signal is a frequency value.

3. The quantification indicating circuit according to claim 1, wherein the numerical signal is a voltage value.

4. The quantification indicating circuit according to claim 1, wherein the numerical signal is a temperature value.

5. The quantification indicating circuit according to claim 1, wherein the converting circuit respectively compares the numerical signal with the threshold values by a plurality of comparison circuits to generate a comparison result and converts the comparison result to the plurality control bits.

6. The quantification indicating circuit according to claim 5, wherein the comparison result is converted to the plurality control bits, according to two closest threshold values between which the numerical signal is converted to the plurality control bits.

7. The quantification indicating circuit according to claim 1, wherein the indicating lamps of the indicating lamp set comprises:
   a first indicating lighten element connected to the first common output terminal of the three diodes of the first logic circuit;
   a second indicating lighten element connected to the second common output terminal of the two diodes of the second logic circuit;
   a third indicating lighten element connected to the output terminal of the diode of the third logic circuit;
   a fourth indicating lighten element connected to the first common input terminal of the two diodes of the fourth logic circuit; and a fifth indicating lighten element connected to the second common input terminal of the three diodes of the fifth logic circuit.

8. The quantification indicating circuit according to claim 1, wherein the circuit board is a motherboard.

9. The quantification indicating circuit according to claim 1, wherein the indicating lighten elements of the indicating lighten element set are arranged in a row, and the circuit board under the indicating lighten elements has a plurality of indicating patterns.

10. The quantification indicating circuit according to claim 9, wherein the indicating patterns are triangle.

* * * * *

UNITED STATES PATENT AND TRADEMARK OFFICE
CERTIFICATE OF CORRECTION

PATENT NO.        : 8,199,026 B2
APPLICATION NO.   : 12/190598
DATED             : June 12, 2012
INVENTOR(S)       : Lin et al.

It is certified that error appears in the above-identified patent and that said Letters Patent is hereby corrected as shown below:

On the cover page, item (73) Assignee's Name
"ASUSTek COMPUTER INC." should be changed to -- ASUSTeK COMPUTER INC. --.

Signed and Sealed this
Thirty-first Day of July, 2012

David J. Kappos
*Director of the United States Patent and Trademark Office*